(12) United States Patent
Joyce

(10) Patent No.: US 6,222,453 B1
(45) Date of Patent: *Apr. 24, 2001

(54) APPARATUS FOR HOLDING A COMPACT DISK AND ACCEPTING AFFIXATION OF AN ELECTRONIC ANTI-THEFT TAG

(75) Inventor: Michael P. Joyce, Kinnelon, NJ (US)

(73) Assignee: Nexpak, North Canton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,331

(22) Filed: Mar. 24, 1999

(51) Int. Cl.[7] .................................................... G08B 13/14
(52) U.S. Cl. .................................. 340/572.8; 340/693.9; 340/693.12
(58) Field of Search ........................ 340/572.8, 551, 340/693.5, 693.9, 693.12; 335/284

(56) References Cited

U.S. PATENT DOCUMENTS

| | | | |
|---|---|---|---|
| 4,689,590 | * 8/1987 | Heltemes | 340/572.8 |
| 4,692,746 | * 9/1987 | Budin et al. | 340/572.8 |
| 4,967,184 | * 10/1990 | Regelsberger | 340/572.8 |
| 5,081,446 | * 1/1992 | Gill et al. | 340/572.8 |
| 5,218,342 | * 6/1993 | McCrackin | 340/572.8 |
| 5,253,821 | * 10/1993 | Johnson | 340/572.8 |
| 5,894,268 | * 4/1999 | McLaren | 340/572.8 |
| 5,910,770 | * 6/1999 | Ohara | 340/572.8 |

* cited by examiner

Primary Examiner—Benjamin C. Lee
(74) Attorney, Agent, or Firm—Kaplan & Gilman, LLP

(57) ABSTRACT

An improved apparatus for holding a compact disk such that an electronic anti-theft tag may be affixed thereon flush with the base of the apparatus such that labeling or shrink wrap may be placed flush on the base, concealing the anti-theft tag without having any unsightly protrusions.

7 Claims, 1 Drawing Sheet

APPARATUS FOR HOLDING A COMPACT DISK AND ACCEPTING AFFIXATION OF AN ELECTRONIC ANTI-THEFT TAG

TECHNICAL FIELD

This invention relates to affixing an electronic anti-theft tag to a compact disk case such that the tag may be concealed and does not protrude from the case.

BACKGROUND OF THE INVENTION

The use of electronic anti-theft tags is a known deterrent measure for the prevention of shoplifting of compact disks containing music, video or software. A common such disk is known as a digital video disk, (DVD). Such tags are affixed to exterior surfaces of compact disk cases and/or to exterior surfaces of shrink wrap used to envelope compact disk cases. While the use of such tags is desirable from a theft deterrent standpoint, it is not without disadvantages.

Electronic anti-theft tags protrude from the surfaces upon which they are affixed. Such protrusion hinders the stackable storage of compact disk cases. The cases themselves have generally planar exterior surfaces which allow for easy stackable storage of the cases. By affixing an anti-theft tag to a case, the exterior surface upon which it is attached can no longer come into direct planar contact with the surface of other cases. Thereby, the stackable storage characteristic of the cases is destroyed.

Electronic anti-theft tags also detract from the aesthetic quality of compact disk cases, thereby detracting from their marketability. If a tag is mounted on an exterior surface, in front of a label or shrink wrap, it is a readily perceptible eyesore which detracts from the art, text and symmetry of the case label. If a tag is mounted beneath a label or shrink wrap, the tag creates an unsightly bulge which again detracts from the art and text of the case label. If the tag is mounted on the inside of the disk case, it becomes difficult to install the tags after the case is manufactured, because each case must be opened first, the tag installed, and reclosed. Such a sequence of steps is cumbersome to perform in an automated. Finally, the tab can be peeled off by a thief.

In view of the above, there exists a need in the art for a compact disk case apparatus which allows the affixation of an anti-theft tag without destroying the storage and aesthetic characteristics inherent to compact disk cases.

SUMMARY OF THE INVENTION

The above and other problems with the prior art are overcome in accordance with the invention which relates to an improved apparatus for holding a compact disk such that an electronic anti-theft tag may be affixed thereon flush with the base of the apparatus such that labeling may be placed flush on the base, concealing the anti-theft tag without having any unsightly protrusions. A concave indentation is provided in the base such that the anti-theft tag may be fittingly affixed therein. The concave indentation is shaped and sized to match the size of the antitheft tag, and the insertion of the tag that results in a flat surface. In a preferred embodiment, a relatively small rectangular shaped tag is utilized.

DETAILED DESCRIPTION OF THE PREFERRED EMBODIMENT

Figure 1:
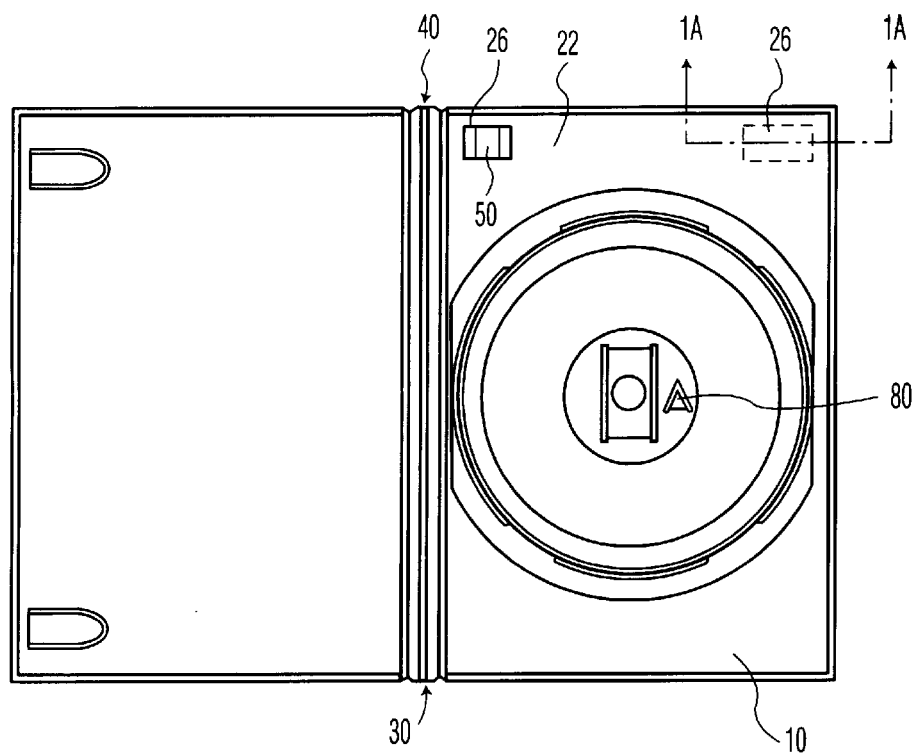
FIG. 1 is a top view of a compact disk holding apparatus in the open position incorporating a concave indentation wherein an electronic anti-theft tag is affixed.

The DVD case 1 of FIG. 1 is a case which may be of any number of generally known configurations. It comprises a lid portion 10, a base portion 20 and a spine portion 30, which is connected to the lid portion 10 and to the base portion 20 by living hinges 40. The central portion 80 includes both the button and other support means for holding the DVD or other type of disk in accordance with known techniques.

Base portion 20 has an exterior surface 22 with a substantially planar portion and a concave indentation 26. Concave indentation 26 is rectilinear in dimension with a consistent shallow depth. The dimension and depth preferably correspond to the dimensions of a standard electronic anti-theft tag 50. Anti-theft tag 50 is affixed by means of an adhesive within concave indentation 26, such that it is preferably flush with planar portion 22.

Figure 1A:
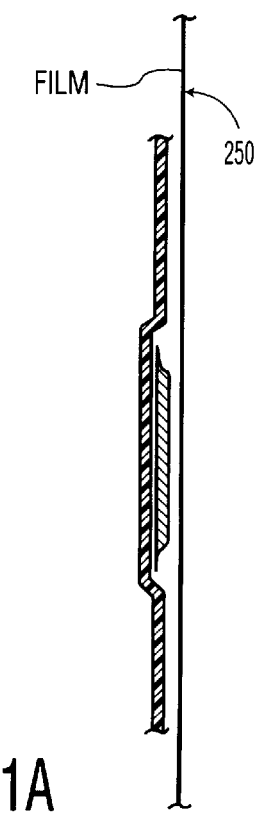

In the manufacturing process, the concave indentation 26 may be molded into the DVD case of FIG. 1 in the single molding step used to form the case. The theft deterrent tag 50 may then be placed in the indent 26 and covered with any label and shrinkwrap or other plastic or similar coating placed over the DVD case. FIG. 1A shows a side view with an exemplary clear film covering the case.

The above describes the preferred embodiment of the invention. It is understood that various modifications and additions will be apparent to those of skill in the art. Such additions are intended to be covered by the claims appended thereto.

What is claimed is:

1. An apparatus for holding a compact disk, including a base portion with an exterior surface, the exterior surface having a substantially planar portion and a concave indentation portion, wherein the concave indentation portion is substantially the size and shape of an electronic anti-theft tag whereby said anti-theft tag is fittingly affixed within said concave indentation portion such that the tag is substantially flush with the planar portion.

2. The apparatus of claim 1 wherein the apparatus is formed of one piece of molded plastic.

3. The apparatus of claim 1 further comprising a label adhesively affixed on top of the planar portion and the electronic anti-theft tag.

4. The apparatus of claim 1 further comprising a plastic wrap enveloping around the entire apparatus.

5. A method of producing a case for holding a compact disk in a configuration including a base portion with an exterior surface, the exterior surface having a substantially planar portion and a concave indentation portion, wherein an electronic anti theft tag is fittingly affixed within the concave indentation portion such that the tag is flush with the substantially planar portion, the method comprising molding the disk case with the concave indentation portion in a single step and placing said electronic anti theft tag within said concave indentation portion.

6. The method of claim 5 further comprising the step of placing an adhesive in the indentation portion prior to the step of placing the electronic anti theft device within said concave indentation.

7. The method of claim 6 wherein the indentation portion is later covered by a label or shrink wrap.

* * * * *